United States Patent
Apelsmeier

(10) Patent No.: US 9,731,704 B2
(45) Date of Patent: Aug. 15, 2017

(54) MOTOR VEHICLE HAVING AN AIR CONDITIONER COMPRESSOR AS A STARTER OF THE INTERNAL COMBUSTION ENGINE

(71) Applicant: AUDI AG, Ingolstadt (DE)

(72) Inventor: Andreas Apelsmeier, Pollenfeld (DE)

(73) Assignee: AUDI AG, Ingolstadt (DE)

( * ) Notice: Subject to any disclaimer, the term of this patent is extended or adjusted under 35 U.S.C. 154(b) by 65 days.

(21) Appl. No.: 14/911,623

(22) PCT Filed: Aug. 1, 2014

(86) PCT No.: PCT/EP2014/002130
§ 371 (c)(1),
(2) Date: Feb. 11, 2016

(87) PCT Pub. No.: WO2015/022059
PCT Pub. Date: Feb. 19, 2015

(65) Prior Publication Data
US 2016/0193991 A1    Jul. 7, 2016

(30) Foreign Application Priority Data
Aug. 14, 2013 (DE) .......................... 10 2013 013 541

(51) Int. Cl.
*G06F 19/00* (2011.01)
*B60W 20/10* (2016.01)
(Continued)

(52) U.S. Cl.
CPC ............ *B60W 20/10* (2013.01); *B60H 1/004* (2013.01); *B60H 1/00428* (2013.01); *B60K 6/26* (2013.01);
(Continued)

(58) Field of Classification Search
USPC .......................................................... 701/22
See application file for complete search history.

(56) References Cited

U.S. PATENT DOCUMENTS 8,594,867 B2 * 11/2013 Heap ...................... B60K 6/365
                                                  180/65.21
2002/0124580 A1 * 9/2002 Suitou .................... B60H 1/322
                                                  62/133
(Continued)

FOREIGN PATENT DOCUMENTS

DE       100 01 436      8/2000
DE       199 31 963      1/2001
(Continued)

OTHER PUBLICATIONS

International Search Report issued by the European Patent Office in International Application PCT/EP2014/002130 dated Aug. 1, 2014.

*Primary Examiner* — Ronnie Mancho
(74) *Attorney, Agent, or Firm* — Henry M. Feiereisen LLC

(57) ABSTRACT

A motor vehicle includes a hybrid drive having an internal combustion engine and an electric drive motor, and an air conditioning system having a compressor configured to compress a refrigerant, and an electric motor configured to operate the compressor and to start the internal combustion engine as electric starter when being coupled with the internal combustion engine. The electric motor has an inverter to operate the electric motor directly with high voltage of a high-voltage onboard electrical system of the motor vehicle so as to enable the electric motor to apply a mechanical torque for re-staring the internal combustion engine in case of need in the absence of any assistance from the electric drive motor. A clutch device mechanically (Continued)

couples the electric motor of the air conditioning system with the internal combustion engine in response to a control signal.

9 Claims, 1 Drawing Sheet

(51) Int. Cl.
B60H 1/00 (2006.01)
B60W 10/30 (2006.01)
B60W 30/18 (2012.01)
F02N 11/00 (2006.01)
F02N 11/04 (2006.01)
B60K 6/28 (2007.10)
B60L 1/00 (2006.01)
B60W 10/06 (2006.01)
B60W 10/08 (2006.01)
B60W 20/40 (2016.01)
B60W 20/14 (2016.01)
B60K 6/26 (2007.10)
B60K 6/442 (2007.10)
B60W 10/02 (2006.01)
F02N 11/08 (2006.01)
B60K 6/48 (2007.10)
H02J 7/02 (2016.01)

(52) U.S. Cl.
CPC ............... *B60K 6/28* (2013.01); *B60K 6/442* (2013.01); *B60L 1/003* (2013.01); *B60W 10/02* (2013.01); *B60W 10/06* (2013.01); *B60W 10/08* (2013.01); *B60W 10/30* (2013.01); *B60W 20/14* (2016.01); *B60W 20/40* (2013.01); *B60W 30/18127* (2013.01); *F02N 11/003* (2013.01); *F02N 11/04* (2013.01); *F02N 11/0866* (2013.01); *B60K 2006/268* (2013.01); *B60K 2006/4825* (2013.01); *B60L 2240/423* (2013.01); *B60L 2240/443* (2013.01); *B60L 2260/26* (2013.01); *B60W 2710/083* (2013.01); *B60Y 2200/92* (2013.01); *B60Y 2300/182* (2013.01); *B60Y 2300/42* (2013.01); *B60Y 2300/43* (2013.01); *B60Y 2300/63* (2013.01); *B60Y 2400/88* (2013.01); *F02N 11/006* (2013.01); *F02N 11/084* (2013.01); *F02N 2011/0888* (2013.01); *F02N 2011/0896* (2013.01); *F02N 2200/0806* (2013.01); *F02N 2250/02* (2013.01); *H02J 7/02* (2013.01); *Y02T 10/6252* (2013.01); *Y02T 10/6286* (2013.01); *Y10S 903/93* (2013.01)

(56) References Cited

U.S. PATENT DOCUMENTS

| | | | | |
|---|---|---|---|---|
| 2005/0255968 | A1* | 11/2005 | Sah | B60K 6/445 477/200 |
| 2007/0187953 | A1 | 8/2007 | Park | |
| 2008/0234097 | A1* | 9/2008 | Sah | B60K 6/365 477/3 |
| 2009/0118918 | A1* | 5/2009 | Heap | B60K 6/365 701/54 |
| 2010/0114424 | A1* | 5/2010 | Morris | B60W 30/20 701/51 |

FOREIGN PATENT DOCUMENTS

| | | |
|---|---|---|
| DE | 102005022210 | 11/2006 |
| DE | 102005024411 | 11/2006 |
| DE | 102006013502 | 9/2007 |
| DE | 102009000121 | 7/2010 |
| DE | 102011008795 | 9/2011 |
| DE | 102011080326 | 2/2012 |
| DE | 102011000796 | 8/2012 |
| EP | 0 916 546 | 5/1999 |
| EP | 1026807 | 9/2000 |
| EP | 1 110 774 | 6/2001 |
| EP | 2 065 268 | 3/2009 |

* cited by examiner

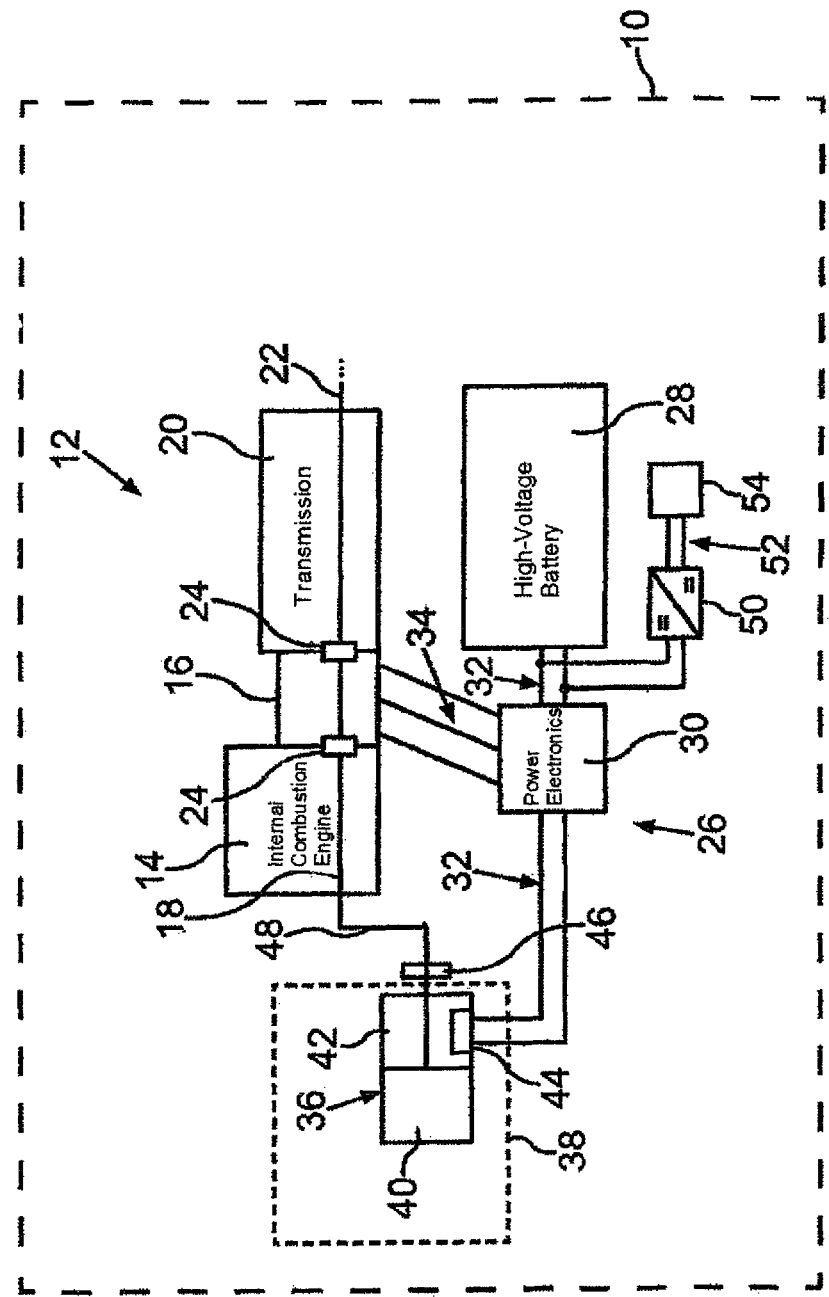

MOTOR VEHICLE HAVING AN AIR CONDITIONER COMPRESSOR AS A STARTER OF THE INTERNAL COMBUSTION ENGINE

CROSS-REFERENCES TO RELATED APPLICATIONS

This application is the U.S. National Stage of International Application No. PCT/EP2014/002130, filed Aug. 1, 2014, which designated the United States and has been published as International Publication No. WO 2015/022059 and which claims the priority of German Patent Application, Serial No. 10 2013 013 541.9, filed Aug. 14, 2013, pursuant to 35 U.S.C. 119(a)-(d).

BACKGROUND OF THE INVENTION

The invention relates to a motor vehicle with an internal combustion engine and an air conditioning system. The air conditioning system includes a compressor which is driven by an electric motor. This electric motor is also used as a starter for the internal combustion engine. A motor vehicle of this kind is, for example, known from US 2007/0187953 A1.

In addition to the clutch device, disclosed in the mentioned publication, for mechanically coupling the electric motor of the compressor of an air conditioning system with, for example, a crankshaft of the internal combustion engine, further clutch devices are known from the publications DE 199 31 963 A1 and DE 100 01 436 A1 for selectively coupling an electric motor with an internal combustion engine for a start of the internal combustion engine. Selectively is here to be understood as relating to a control signal that allows control as to when the clutch device mechanically couples the electric motor with the internal combustion engine and when it does not.

In the context of the invention, an internal combustion engine or a combustion engine is understood to be particularly an Otto engine, a diesel engine, or a Wankel engine. At the start of such an internal combustion engine, the electric motor, used as a starter, requires very much electrical current, which may, for example, be 1,000 amperes. A conventional starter system is powered by the low-voltage onboard electrical system of the motor vehicle. Low voltage is to be understood in the context of the invention as a voltage range between 0 volt and 60 volts. When using this starting system to start the internal combustion engine, the current must be provided from the low-voltage onboard electrical system. This leads to a voltage dip of the low-volt voltage, i.e. for example at 12 volt nominal voltage, this voltage may decrease to a value of less than 8 volts, or even 6 volts.

The low-voltage onboard electrical system also supplies safety-relevant consumers. This may involve, for example, headlights of the motor vehicle, the electronic stability program (ESP), an electrical steering assistance and/or a brake booster. As a result of the voltage dip caused by the start of the internal combustion engine, these safety-relevant consumers are in certain circumstances undersupplied so that they no longer fulfill their function. In the art, the provision of, for example, a power semiconductor is used as remedy which splits the low-voltage onboard electrical system in two parts. Accordingly, during starting procedure, a stable side is established with the rated voltage (e.g. 12 volts for a 12 volt onboard electrical system) for operation of the safety-relevant consumers. The starter is then supplied from a separate low-voltage battery.

SUMMARY OF THE INVENTION

The invention is based on the object to ensure a stable operation of electrical low-voltage consumers in a motor vehicle, even when the compressor motor of the air conditioning system is used to start an internal combustion engine.

The object is achieved in accordance with the invention by the subject matters of the independent claims. Advantageous refinements of the invention are set forth in the dependent claims.

The motor vehicle according to the invention includes an internal combustion engine for operating the motor vehicle for a ride, and an air conditioning system with electric motor to operate a compressor of the air conditioning system. The compressor is driven, as required, by the electric motor for compressing a refrigerant of the air conditioning system. The motor vehicle according to the invention further includes a controllably designed clutch device which is configured to mechanically couple the electric motor of the air conditioning system with the internal combustion engine in dependence on a control signal. Accordingly, the electric motor is configured to operate the internal combustion engine to start the internal combustion engine, when the electric motor is in the state of being coupled with the internal combustion engine, i.e. the electric motor is designed as an electric starter for the internal combustion engine. The clutch device may include one of the clutches described in the mentioned publications. However, other clutches known in the art may be provided in the clutch device, such as an engaging relay, a meshing drive, as it is known from the pre-engaged drive starter, or clutch mechanism known from the serving starter.

The motor vehicle according to the invention includes at least an electrical low-voltage consumer, in particular at least one safety-related electrical consumer to be operated at low-volt voltage. The at least one safety-related electrical consumer may be from the group of headlights, electronic stability program, electric steering assistance, and brake booster. In order to ensure stable operation of the at least one low-voltage consumer, even when the internal combustion engine is started by the electric motor, a high-voltage onboard electrical system and a low-voltage onboard electrical system are provided in a motor vehicle according to the invention. The high-voltage onboard electrical system provides an electric high voltage, which is greater than 60 volts, in particular greater than 120 volts. The at least one low-voltage consumer is connected to the low-voltage onboard electrical system for its electrical supply. In contrast thereto, an inverter for the electric motor of the air conditioning system is designed to operate the electric motor directly with the high voltage of the high-voltage onboard electrical system. In other words, the electric motor is designed as a high-voltage electric motor. Unlike conventional starter systems, the electric motors for compressor drives are also available in high-voltage variants. The air conditioning system may involve a device for air-conditioning of a passenger compartment of the motor vehicle. In addition or as an alternative, the air conditioning system may be designed to air-condition, i.e. to cool and/or to heat, one piece of equipment or multiple pieces of equipment of the motor vehicle, in particular a component of the high-voltage onboard electrical system, for example a traction battery.

The motor vehicle according to the invention has the advantage that due to the supply of the electric motor with high voltage, a correspondingly low electrical current flows during operation of the electric motor as starter for the internal combustion engine. Correspondingly, the voltage dip in the high-voltage onboard electrical system is small. In addition, the high-voltage onboard electrical system and the low-voltage onboard electrical system can easily be separated electrically during start of the internal combustion engine, or the voltage patterns in both onboard electrical systems can be decoupled in a different manner, so that operation of the electric motor as starter has no impact or only a negligible impact on the operation of the low-voltage consumer, in particular the safety-relevant consumers, in the low-voltage onboard electrical system. Therefore, splitting the low-voltage onboard electrical system can advantageously be omitted, thereby saving electrical switching components. In addition, the provision of energy buffering in a separate low-voltage battery for the starter is not required. Thus, overall there is no need for switching components in a motor vehicle according to the invention while still enabling a more stable operation of the safety-relevant consumers, which may lead to an improvement in the Automotive Safety Integrity Level (ASIL) according to ISO 26262.

A high-voltage onboard electrical system is usually provided in a motor vehicle, which has an additional electric drive motor for the ride. In combination with the afore-described internal combustion engine, a hybrid drive is thus established. The supply of the high-voltage onboard electrical system is normally established via a particularly powerful source of electrical energy, such as, for example, a traction battery or a fuel cell stack. According to an advantageous refinement of the motor vehicle according to the invention, the powerful energy source is also used in the low-voltage onboard electrical system by coupling the low-voltage onboard electrical system to the high-voltage onboard electrical system via a DC-DC converter (DC: direct current).

Another advantage results from the configuration of the motor vehicle according to the invention as a hybrid vehicle with hybrid drive also because the high-voltage electric motor for the air conditioning system allows operation as a starter over a greater temperature range than an additional 12-volt battery, as would be necessary for assisting a starter in a low-voltage onboard electrical system. In a hybrid drive in which the internal combustion engine is supported by a 12-volt battery, the optional re-starting of the internal combustion engine, when the electric drive motor alone is no longer sufficient for driving, is only possible to a temperature of normally minus 10° C. At lower temperatures, the internal combustion engine must be operated permanently. In contrast thereto, in case of a high-voltage electric motor as a drive for the compressor, this high-voltage electric motor can be used as starter for the internal combustion engine even at lower temperatures. Therefore, there is advantageously no temperature-dependent lower limit for the re-start of the internal combustion engine in a hybrid drive system.

Motor vehicles with hybrid drive usually have no starter at all for the internal combustion engine. Instead, the electric drive motor for driving the motor vehicle can also be used to optionally start the internal combustion engine by transmitting the torque produced by the electric drive motor to the crankshaft of the internal combustion engine. This, however, suffers the drawback that the electrical drive motor has to be operated at all times with a starter reserve, i.e. for the actual propulsion of the motor vehicle, the electric drive motor may generate only so much torque so that the additional torque required for generating a mechanical torque for starting the internal combustion engine can still be generated in case of need. In particular when diesel engines are involved, this additional torque to start is very great, so that therefore the performance is greatly limited, when purely electric travel mode (propulsion of the motor vehicle only by the electric drive motor) is involved.

Conversely, according to an advantageous embodiment of the motor vehicle according to the invention with hybrid drive, it is possible for a control device of the hybrid drive motor to operate the electric drive motor of the hybrid drive in the absence of such starter reserve. In other words, a difference between a possible maximum driving torque that can be produced by the electric drive motor and a driving torque actually produced by the drive motor for driving the motor vehicle, is less than the mechanical torque needed to start the internal combustion engine. Thus, there is no need for the electric drive motor to supply the mechanical torque necessary for a re-start, when the internal combustion engine has to be re-started in case of need. This is provided in the motor vehicle according to the invention by the electric motor of the air conditioning system.

According a further advantageous embodiment of the motor vehicle according to the invention, a control device of the air conditioning system also does not operate the electric motor of the air conditioning system with a starter reserve during operation of the compressor. In other words, the mechanical torque applied for start of the internal combustion engine is missing in the event the electric motor operates the compressor at that moment and a re-start of the internal combustion engine is required. The power available for air conditioning and cooling is thus briefly reduced, for example, for half a second, a second, or two seconds. Since air conditioning of the motor vehicle interior or the high-voltage system involves a thermal process, the time constants of this process are relatively great, i.e. the brief decrease in power of the air conditioning system at the re-start of the internal combustion engine is not noticeable for people in the vehicle interior and has also no influence on high-voltage components.

Preferably, provision is made for a controllable decoupling device which is configured to mechanically decouple the electric motor of the air conditioning system temporarily from the compressor, in other words, the electric motor can be operated, when the compressor is decoupled, so that the refrigerant of the air conditioning system in the compressor is not moved. This results in the advantage that the electric motor of the air conditioning system can also be operated exclusively as a starter for the internal combustion engine, without operating hereby the compressor. Then, the maximum mechanical power that can be produced by the electric motor is fully available for the starter operation.

By mechanically coupling the electric motor to the internal combustion engine via the clutch device, the electric motor can also assume a further function. According to a further refinement of the motor vehicle according to the invention, the electric motor is designed for operation as an electrical generator to generate electric energy. For this purpose, the inverter of the electric motor has to be configured in a manner known per se. The electric motor in this embodiment is then designed to gain the electric energy either through recuperation, i.e. when coupled to the internal combustion engine, kinetic energy of the motor vehicle is transmitted via the clutch device, for example the crankshaft of the internal combustion engine, to the electric motor and converted there to electric energy. In addition or as an alternative, provision may be made for the internal combustion engine to generate by itself mechanical drive energy, which is then converted by the electric motor to the electric energy. In this way, electric energy can be advantageously gained from the fuel of the internal combustion engine to charge for example a traction battery of the high-voltage onboard electrical system.

The invention is also directed to a method which relates to those embodiments of the motor vehicle according to the invention, in which the high-voltage onboard electrical system and the low-voltage onboard electrical system are connected via a DC-DC converter. To ensure a stable operation of the electrical consumers in the low-voltage onboard electrical system, the process according to the invention initially determines whether there is a demand for a start of the internal combustion engine of the motor vehicle. The demand determination is known from the art in the context of hybrid drives. When there is demand, the electric motor of the air conditioning system is then mechanically coupled to the internal combustion engine by activating the mechanical clutch device accordingly. As the electric motor is operated, the internal combustion engine is started in a manner known per se. During operation of the electric motor to start the internal combustion engine, an electric low voltage in the low-voltage onboard electrical system is then decoupled by the DC-DC converter from the voltage fluctuations caused by the electric motor in the high-voltage onboard electrical system. This can, for example, be realized by switching semiconductor switches, such as transistors of the DC-DC converter, to a blocking state. Provision may also be made for a voltage regulator to regulate the low voltage in the low-voltage onboard electrical system to a desired value, so that again any voltage fluctuation in the high-voltage onboard electrical system is not transmitted to the low-voltage onboard electrical system.

The invention also includes refinements of the method according to the invention, corresponding to the refinements of the motor vehicle according to the invention. For that reason, not all further refinements of the method according to the invention are described again hereinafter.

A particularly preferred embodiment of the method according to the invention provides however that the compressor is driven by the internal combustion engine. As a result, an operating strategy can be realized to enable the selective operation of the compressor with energy from the fuel of the internal combustion engine, or (via the electric motor of the air conditioning system) with energy from the high-voltage onboard electrical system. This offers the possibility to increase the efficiency of the motor vehicle.

A further particularly preferred embodiment of the method provides the operation of the electric motor as a generator for supplying electrical energy into the high-voltage onboard electrical system. The electric motor of the air conditioning system is hereby mechanically driven via the clutch device, for example by the internal combustion engine itself or through recuperative operation of the motor vehicle, and electrical energy is thereby generated by the electric motor which is fed into the high-voltage onboard electrical system.

The motor vehicle according to the invention is preferably designed as a motor car, especially a passenger car.

BRIEF DESCRIPTION OF THE DRAWING

In the following, the invention is described again in greater detail with reference to a concrete exemplary embodiment. For this purpose, the sole FIGURE shows a schematic illustration of an embodiment of the vehicle according to the invention.

DETAILED DESCRIPTION OF PREFERRED EMBODIMENTS

The exemplary embodiment described hereinafter involves a preferred embodiment of the invention. In the exemplary embodiment, the described components of the embodiment represent individual independent features of the invention, which further refine the invention also independently from one another and thus should be considered as part of the invention individually and in combinations other than those shown. Furthermore, the described embodiment can be supplemented by further previously described features of the invention.

The FIGURE schematically shows a motor vehicle 10, which may involve for example a motor car, such as a passenger car. The motor car has a hybrid drive system or in short a hybrid drive 12, which includes an internal combustion engine or a combustion engine 14 and an electric drive motor 16, i.e. an electric machine. The internal combustion engine 14 and the electrical drive motor 16 can work, for example, on a common shaft 18, which can form the crankshaft of the internal combustion engine 14 and the rotor shaft of the electric drive motor 16. Both drive motors 14, 16 may be mechanically coupled in a manner known per se via the transmission 20 with a remainder of a drive train 22, via which the driving force of the drives 14, 16 (not shown) is transferred onto the (not shown) wheels of the motor vehicle 10. The internal combustion engine 14, the electric drive motor 16, and the transmission 20 can be selectively coupled or decoupled via a clutch 24.

The motor vehicle 10 further includes a high-voltage onboard electrical system 26, which, for example, has a high-voltage battery 28 as an electric power source. A power electronics 30, in particular an inverter, may, for example, be connected to the high-voltage onboard electrical system 26 to operate the electric drive motor 16. In the FIGURE, it is shown how the power electronics 30 is able to transfer from DC high-voltage lines 32 of the high-voltage onboard electrical system 26a a multi-phase alternating voltage, for example a three-phase AC voltage, into a multi-phase alternating voltage line 34.

An electric air conditioning compressor 36 of the motor vehicle 10 can also be supplied with electrical energy, for example from the high-voltage battery 28 via the DC lines 32. The electric air conditioning compressor 36 may be part of an air conditioning system 38 of the motor vehicle 10, by which, for example, a passenger compartment of the motor vehicle 10 or, for example, the high-voltage battery 28 and other high-voltage components, can be air-conditioned. The electric air compressor can include a compressor 40 and an electric motor 42 for driving the compressor 40.

An inverter 44 of the electric motor 42 may be configured to convert the high-voltage direct current from the DC lines 32 into a multi-phase, in particular three-phase, AC voltage for driving the electric motor 42. A shaft 46 of the electric motor 42 may be coupled via a clutch 46 and, optionally, also via a belt or a pinion 48 with the internal combustion engine 14, for example with the crankshaft 18 thereof.

A low-voltage onboard electrical system 52 can be connected via a DC-DC converter 15 to the high-voltage onboard electrical system 26. A voltage of the high-voltage onboard electrical system 26 may, for example, be 400 volts, whereas a voltage of the low-voltage onboard electrical system may be, for example, 12 volts. A group of one or more electrical consumers 54 that are low-voltage consumers can be connected to the low-voltage onboard electrical system 42. The group includes in particular at least one safety-relevant consumer, such as a headlight, an electronic stability program, an electrical steering assistance, and a brake booster. An electric steering assistance is meant to be a system which assists the driver when applying a steering force or automatically executes a steering intervention when, for example, a collision of the motor vehicle 10 with an obstacle is imminent and the driver has overlooked it.

The motor vehicle 10 can further include a (not shown) charger device for charging the high-voltage battery 28 via a vehicle-external supply network, for example, a network with 230-volt voltage and 50-Hertz frequency.

The motor vehicle 10 is operated in a manner known per se in dependence on a currently selected operating strategy in a manner known per se either purely electrical using the electric drive motor 16 or in hybrid mode using both the internal combustion engine 14 and the electric drive motor 16. As a result, the internal combustion engine 14 can be started at all times without loss of comfort. Still, despite the high power consumption of the starter for the internal combustion engine 14, a stable electrical supply of the safety-relevant consumers 54 in the low-voltage onboard electrical system must be ensured.

For this purpose, the electric air conditioner compressor 36 is used in the motor vehicle 10 as starter for the internal combustion engine 14. This electric air conditioner compressor 36 is, however, fed from the high-voltage onboard electrical system 26 and is comprised of an inverter, i.e. the inverter 44, an electric motor 42, and the compressor 40, which acts as a heat pump. The fundamental idea now is that the electric air conditioner compressor 36 is mechanically coupled to the internal combustion engine 14 in accordance with a conventional 12-volt starting system by means of the clutch 46 and is operated as starter via the already available inverter and the electric motor 42. The power available for air conditioning and cooling by the air conditioning system 38 is thus momentarily reduced, for example a second. Since thermal processes are, however, involved that are temporally very sluggish, this is tolerable in a vehicle. In addition, the electric motor 42 can also easily be dimensioned sufficiently to start even a powerful internal combustion engine 14, for example a diesel engine with 200 hp nominal power. For example, an electric motor 42 with an output of 2 kilowatts to 8 kilowatts can be easily supplied via a high-voltage onboard electrical system 26. Such electric motors are available especially in high-voltage air-conditioning systems.

The low-voltage onboard power supply 52 can be decoupled from the high-voltage onboard electrical system 26 via the DC-DC converter. Also, additional energy storage in the low-voltage onboard electrical system 52 is no longer needed. In addition, no power semiconductor is necessary for separating the low-voltage onboard electrical system 52, as it may be necessary when operating a low-voltage starter system. Another point is that the re-start of the internal combustion engine 14 can be executed over the entire temperature range, and thus full electric driving performance, especially also at very low temperatures, is possible, since the internal combustion engine 14 can also be started in this case at any time selectively by the electric motor 42. Starting of the internal combustion engine 14 is to be understood as relating to put the ignition process of the internal combustion engine 14 in motion. By providing two clutches 24, one for selectively coupling and decoupling of the internal combustion engine 14 and the electric drive motor 16, and one for selectively coupling and decoupling of the electric driving motor 16 and the drive train 22, it is also possible to operate the hybrid drive 12 both as a serial hybrid and also as a parallel hybrid. As a serial hybrid, the internal combustion engine 14 and the electric drive motor 16 are mechanically decoupled so that the internal combustion engine 14 can be operated at a particularly energy-efficient rotation speed and electrical power can then be produced by means of the electric motor 42 as the clutch 46 is engaged, with the electric power then being able to be fed into the high-voltage onboard electrical system 26 and thereby supplied via the power electronics 30 to the electric drive motor 16. As a parallel hybrid, the internal combustion engine 14 and the electric drive motor 16 are mechanically coupled via the clutch 24, so that also the internal combustion engine 14 acts directly mechanically on the drive train 22.

Finally, it must be also mentioned that depending on the operating strategy, the power for the electric air conditioner compressor 36 can be provided selectively from the internal combustion engine 14 (via the clutch 46) or from the high-voltage onboard electrical system 26, thereby again realizing a degree of freedom for adjusting an optimal efficiency.

Control of the clutch 46 can be implemented by a control device, which may be realized for example by a control unit. Also, control of the power electronics 30 can be implemented in a manner known per se by a control unit of the hybrid drive 12, and the mechanical power generated by the electric drive motor 16 can hereby be adjusted.

Overall, it thus has been shown how the invention enables use of an electric high-voltage air conditioner compressor as start system for a hybrid drive to thereby ensure a stable operation of safety-relevant consumers in a low-voltage onboard electrical system of a motor vehicle and to realize this at the same time without a separate starter. The use of the high-voltage compressor thus provides the synergistic effect of the saved separate starter and simultaneously stabilized low-voltage onboard electrical supply.

The invention claimed is:
1. A motor vehicle, comprising:
a hybrid drive for driving the motor vehicle, said hybrid drive including an internal combustion engine and an electric drive motor;
a low-voltage onboard electrical system configured to supply electric energy to at least one low-voltage consumer;
a high-voltage onboard electrical system configured to provide a high voltage of more than 60 volts;
an air conditioning system including a compressor configured to compress a refrigerant, and an electric motor configured to operate the compressor and to start the internal combustion engine as electric starter when being coupled with the internal combustion engine, said electric motor including an inverter configured to operate the electric motor directly with the high voltage of the high-voltage onboard electrical system to enable the electric motor to apply a mechanical torque for re-staring the internal combustion engine in case of need in the absence of any assistance from the electric drive motor;
a clutch device configured to mechanically couple the electric motor of the air conditioning system with the internal combustion engine in response to a control signal; and a control device configured to operate the electric drive motor of the hybrid drive without starter reserve, which is necessary for generating the mechanical torque for starting the internal combustion engine, so that a difference between a maximum torque that can be generated by the electric drive motor and an actually generated drive torque of the electric drive motor for driving the motor vehicle is less than the mechanical torque required for starting the internal combustion engine.

2. The motor vehicle according to claim 1, further comprising a DC-DC converter configured to couple the low-voltage onboard electrical system to the high-voltage onboard electrical system.

3. The motor vehicle according to claim 1, wherein the air conditioning system includes a control device configured to operate the electric motor of the air conditioning system without starter reserve so that application of the mechanical torque to re-start the internal combustion engine is accompanied by a momentary reduction of an available power to provide air conditioning and cooling, when the electric motor operates the compressor and re-start of the internal combustion engine is demanded.

4. The motor vehicle according to claim 1, further comprising a controllable decoupling device configured to temporarily mechanically decouple the electric motor of the air conditioner from the compressor in response to a decoupling signal.

5. The motor vehicle according to claim 1, wherein the electric motor is configured to operate as an electric generator for generating electric energy through recuperation of kinetic energy of the motor vehicle during deceleration of the motor vehicle and/or from a mechanical drive energy generated from the internal combustion engine, while the electric motor is coupled to the internal combustion engine via the clutch device.

6. The motor vehicle according to claim 1, wherein the electric motor is connected to the high-voltage onboard electrical system to receive electrical high-volt voltage, even at an ambient temperature of minus 10° C., for starting the internal combustion engine.

7. A method of operating a motor vehicle having a hybrid drive with an electric drive motor and an internal combustion engine, and an air conditioning system with an electric motor, said method comprising:
  determining the presence of a demand for starting the internal combustion engine;
  in the presence of the demand, mechanically coupling the electric motor of the air conditioning system with the internal combustion engine by activating a mechanical clutch device to thereby operate the electric motor to start the internal combustion engine by applying a mechanical torque for re-staring the internal combustion engine in the absence of any assistance from the electric drive motor; and
  during operation of the electric motor and starting the internal combustion engine, using a DC-DC converter to decouple an electric low-volt voltage in a low-voltage onboard electrical system of the motor vehicle from a voltage fluctuation caused by the electric motor in a high-voltage onboard electrical system of the motor vehicle.

8. The method of claim 7, further comprising: operating a compressor of the air conditioning system via the internal combustion engine.

9. The method of claim 7, wherein the electric motor of the air conditioning system is mechanically driven via the clutch device so that the electric motor generates electrical energy which is fed into the high-voltage onboard electrical system of the motor vehicle.

* * * * *